Figure 1:
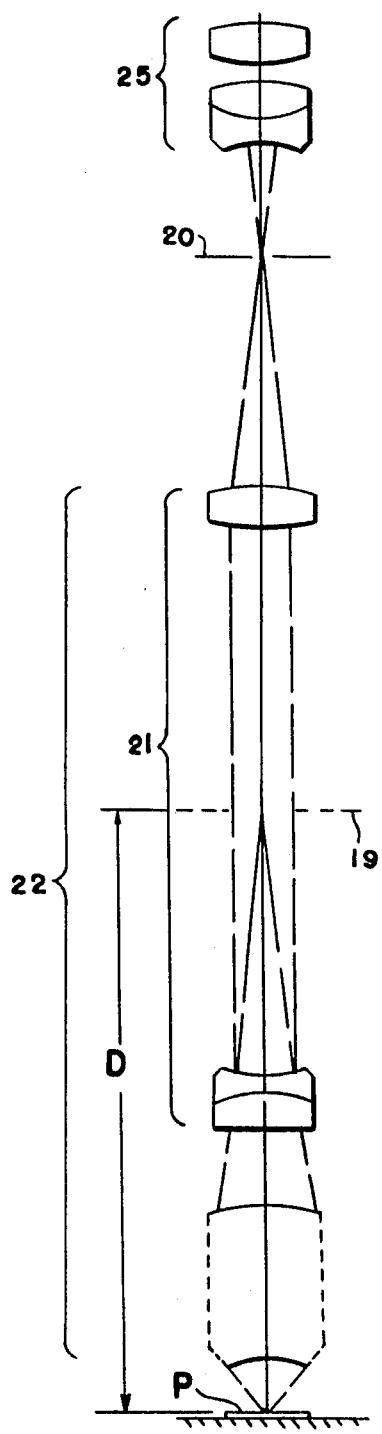

[11] 3,583,789

[72] Inventor Harold Brighto
[21] Appl. No. 874,512
[22] Filed Nov. 6, 1969
[45] Patented June 8, 1971
[73] Assignee Bausch & Lomb Incorporated
Rochester, N.Y.

[54] MULTIPOWERED MICRO-OBJECTIVE GROUP HAVING COMMON MEANS FOR ABERRATION CORRECTION
3 Claims, 4 Drawing Figs.

[52] U.S. Cl. ................................................. 350/183,
350/214, 350/215, 350/216
[51] Int. Cl. ....................................................... G02b 9/64,
G02b 15/06, G02b 21/02

................................. 350/214,
215, 216, 183

[56] References Cited
UNITED STATES PATENTS
| | | | |
|---|---|---|---|
| 3,432,226 | 3/1969 | Bird............................. | 350/214 |
| 3,437,398 | 4/1969 | Muller et al. ................ | 350/214X |

*Primary Examiner* — John K. Corbin
*Attorney* — Frank C. Parker

ABSTRACT: A group of micro-objectives having progressively increasing positive powers from low to high values, each of said micro-objectives cooperating individually with a stationary aberration-correcting lens system used in common to correct the image aberrations, such as field curvature, Petzval condition, secondary spectrum, coma, and tangential and sagittal astigmatism, produced by the optical system.

PATENTED JUN 8 1971

3,583,789

SHEET 1 OF 2

HAROLD E. ROSENBERGER
INVENTOR.

BY *Frank C. Parker*
ATTORNEY

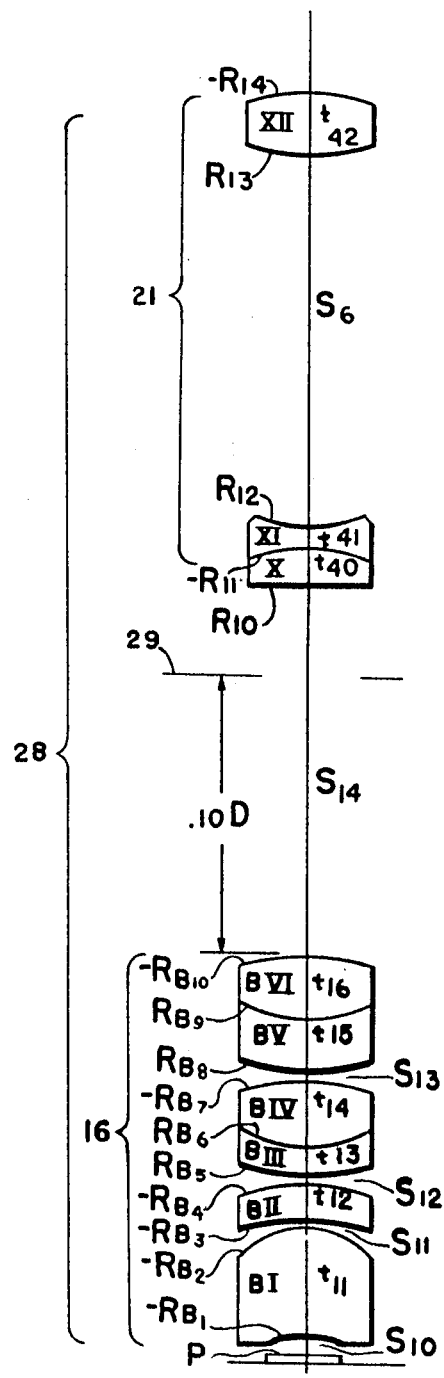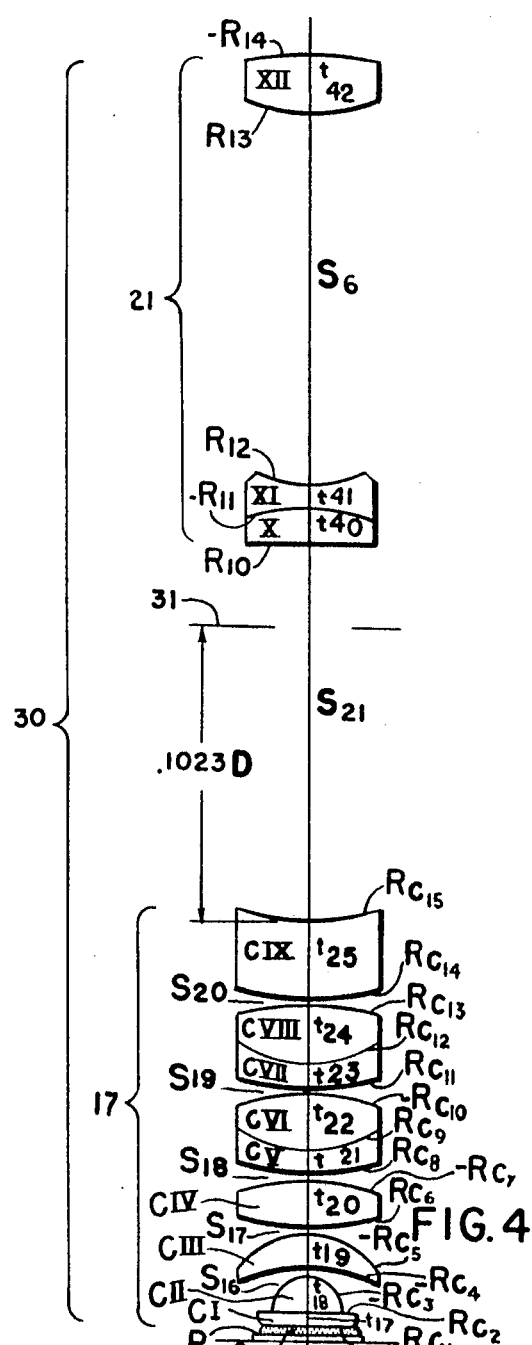
FIG. 3
FIG. 4
HAROLD E. ROSENBERGER
INVENTOR.
BY Frank C. Parker
ATTORNEY

MULTIPOWERED MICRO-OBJECTIVE GROUP HAVING COMMON MEANS FOR ABERRATION CORRECTION

BACKGROUND OF THE INVENTION

The present invention relates generally to optical systems for microscopes and more particularly it relates to improvements in systems which include aberration-correcting lenses therein.

Although the prior art shows a continuing advancement in efforts to improve the image quality of optical systems for microscopes, the best of these efforts have usually been applicable only to the highest grade and most expensive instruments so that widespread use of such instruments has been hindered.

Efforts to achieve field flattening have been paramount and have followed one or more of the courses indicated herebelow:

a. The axial distance between the specimen plane and the objective shoulder is increased.

b. The front lenses are made of the newer unusually high-index glasses having low dispersion values.

c. The front surface of the lens adjacent to the specimen in higher powered dry objectives is formed strongly concave toward the specimen.

d. Thick meniscus lenses are used at the front and rear of the higher powered objectives.

While the above-mentioned methods, used either singly or in combination, are effective in achieving a satisfactory degree of field flattening, the resultant objective design becomes exceedingly complex involving severe manufacturing difficulties and high costs.

On the other hand, efforts to increase the use of microscopes by reducing the manufacturing cost of the objective optical system have usually resulted in undesirable reduction in optical performance. The current need of microscope users is a microscope optical system of simple form and comparatively low cost which is capable of high-grade performance, particularly as regards astigmatism, coma, spherical aberration and field flatness.

The most pertinent art known is applicant's previous patent application Ser. No. 732,485 filed May 2, 1968, now U.S. Pat. No. 3,481,665 which is a continuation-in-part of a parent patent application Ser. No. 408,875 filed Nov. 4, 1964, now abandoned.

In view of the foregoing considerations, it is an object of the present invention to provide an interrelated plurality of novel microscope semiobjectives which are simple in structure and of low cost, but nevertheless capable of an unusually high grade of optical performance.

It is a further object to provide such a plurality of interrelated microscope semiobjectives in combination with an aberration corrector lens system which is used individually with each of the microscope semiobjectives, said corrector lens system acting especially to reduce to near optimum values such optical characteristics as astigmatism, field curvature and lateral chromatism for each microscope objective combination.

Figure 2:
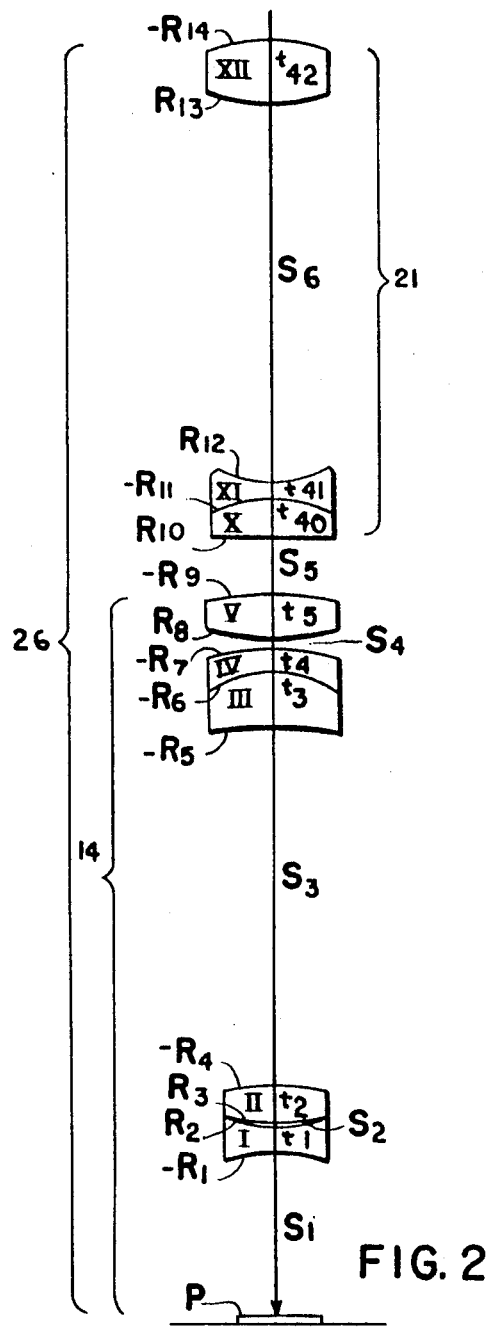

Further objects and advantages will be apparent in the details of construction and combinations and arrangements of the constituent parts of said plurality of microscope objectives which are described in the specification herebelow and are shown in the accompanying drawing, wherein:

FIG. 1 is an optical diagram which is explanatory of the general features of said invention; and FIGS. 2 to 4 are optical diagrams showing a group of individual microscope objectives having progressively increasing magnifications which are included in said plurality of microscope objectives in a preferred form of the present invention.

Generally speaking, the inventive concept here disclosed is intended to provide a high-performance optical system for a plural-objective microscope and particularly the objective lens system whereby for economical reasons an aberration corrector lens system is common to each, the outstanding improvement being:

1. Flattening of the field of the objective lens systems.
2. Correction of residual lateral color so that standard eyepieces may be used.
3. Correction of astigmatism.
4. Correction of spherical aberration and coma.

Improvement in flatness of field is obtained principally by changes in the usual first-order parameters of the objective system. Said changes include:

a. An increase in the focal lengths of the higher powered semiobjectives and a consequent reduction in the undercorrected or inward Petzval sum of these semiobjectives.

b. Working the semiobjectives at substantially reduced magnifications relative to the magnifications of objectives of comparable numerical aperture in standard objective series.

c. Working the semiobjectives within a substantially reduced object-to-image distance relative to that within which standard series objectives work.

d. Introducing an aberration corrector lens system designed to work successively as an integral optical component with each semiobjective of the series, said aberration corrector lens system working at a magnification such that the product of semiobjective magnification times aberration corrector lens system magnification is equal to the magnification of standard objectives of comparable numerical aperture, and introducing Petzval sum, astigmatism and lateral chromatism contributions which aid in the correction of the field of each semiobjective.

The new series of microscope objectives 22 are designed for image magnifications of 4.0x, 40.0x and 100.0x in progressive steps, and the individual semiobjectives are correspondingly designed for image magnification of 0.8x, 8.0x, and 20.0x per se.

To more clearly explain the above reference to focal lengths in paragraph (a), a comparison chart identified as table I is provided herebelow in which a typical group of standard or conventional microscope objectives are compared numerically with said group of semiobjectives.

TABLE I

| Standard objectives | | Semi-objectives | |
|---|---|---|---|
| Magnification | Focal length, mm. | Magnification* | Focal length, mm. |
| 3.5X | 30.9 | 4X | 16.5 |
| 43X | 4.0 | 40X | 6.9 |
| 97X | 1.8 | 100X | 3.3 |

*When combined with the field corrector lens system 21.

The above references to the correction of astigmatism and Petzval condition are further elucidated by reference to table II herebelow wherein the Petzval focus as well as the tangential and sagittal foci are evaluated and compared for the same typical group of microscope objectives as used in Table I, the values therein being given in "focal ranges" or range of focus of the respective microscope objectives.

TABLE II

| Standard objectives | | | | Flat field series | | | |
|---|---|---|---|---|---|---|---|
| Magnification | Petzval focus | Tangential focus | Sagittal focus | Magnification* | Petzval focus | Tangential focus | Sagittal focus |
| 3.5X | −0.8 | −3.2 | −1.6 | 4X | −0.3 | −0.4 | −0.3 |
| 43X | −5.2 | −7.8 | −6.0 | 40X | −1.3 | +0.1 | −0.9 |
| 97X | −12.6 | −14.8 | −13.3 | 100X | −3.8 | −3.9 | −3.9 |

*Includes aberration corrector lens system 21. Minus values relate to an undercorrected or inward condition whereas plus values mean overcorrected or backward condition.

In table III herebelow are given the values in "focal ranges" of correction for Petzval sum, as well as tangential and sagittal foci similar to Table II contributed by the aberration corrector lens system per se in the objective systems which include the chosen group of semiobjectives.

TABLE III

Aberration corrector lens system

| Magnification | Petzval focus | Tangential focus | Sagittal focus |
|---|---|---|---|
| 4X | +1.2 | +10.4 | +4.3 |
| 40X | +0.6 | +8.0 | +3.1 |
| 100X | +0.4 | +5.8 | +1.8 |

In the aforementioned group of semiobjectives, the higher magnification semiobjectives such as 40x and 100x are somewhat overcorrected for lateral chromatism as a consequence of the great difficulty in reducing this characteristic. As a further feature of the invention, the designs of the low magnification semiobjectives such as 4x deliberately incorporate an amount of overcorrected lateral chromatism substantially equal to that remaining in the higher powered semiobjectives. Since the amount of overcorrected lateral chromatism is substantially the same in all semiobjectives, the correction for residual lateral chromatism may be completely designed into a single telescope lens whereby it is unnecessary to design such a correction into a compensating type of eyepiece.

As described above, it will be seen that the aberration corrector lens system 21 includes negative lens member (X, XI) which substantially collimates the rays coming from the semiobjectives 14, 16 and 17 and concurrently corrects at least tangential and sagittal astigmatism, coma and field curvature, while the positive lens member XII focuses said collimated rays and corrects substantially all residual lateral chromatism in the entire lens system 26, 28 and 30.

According to the present invention, a typical set of interrelated semiobjectives are provided in a rotatable nosepiece, the magnification ratings, focal lengths, and numerical apertures of the respective semiobjectives 14, 16 and 17 ranging between low to high values, the magnification values thereof being much less than corresponding values in standard objectives, and the preferred values related to the semiobjectives per se are given in table IV herebelow.

TABLE IV

| Magnification rating | Focal length | Numerical aperture |
|---|---|---|
| 0.8X | 16.517 | 0.09 |
| 8.0X | 6.917 | 0.65 |
| 20X | 3.269 | 1.25 |

As mentioned above, each of the semiobjectives is incompletely corrected for aberrations and is designed with due regard to the optical properties of the other semiobjectives in the series or group and together these semiobjectives constitute a matched set.

The master or principle parameter designated D in the drawings and specifications, and represents the axial distance from the specimen or cover glass surface P to the image plane 19 formed by the semiobjectives 14, 16 and 17 per se. The numerical value of distance D is substantially 80.0 mm.

Further comprised in said invention is an aberration corrector lens system 21 which is mounted in any preferred manner in the stationary portions of the multiple-objective nosepiece and/or tube in optical alignment with the individual semiobjective which is positioned for use. As described above, the aberration corrector lens system 21 includes a negative focal length lens member together with a positive focal length telescope objective member which compensate both the astigmatism and field curvature produced by the aforementioned semiobjectives as well as residual lateral chromatism. The focal lengths of the members of the aberration corrector lens system 21 have optimum values as specified hereinafter such that the image field 20 is flattened to an excellent degree. The corresponding ideal magnification rating for the aberration corrector lens system 21 turns out to be substantially $+5x$.

Within the limits of the above-described objective lens systems, and particularly with regard to the group of semiobjectives, many specific optical designs may be developed, and in the case of the 5x magnification aberration corrector lens system 21 a specific and preferred form of this lens is given hereinafter.

In one successful form of the invention, the aberration corrector lens system 21 is composed of a front negative doublet lens and a rear positive singlet lens, said doublet being composed of a plano convex lens element designated X which lies in contact along its rear surface with a double concave lens element designated XI, and the aforesaid positive singlet lens being designated XII. The focal lengths $F_X$, $-F_{XI}$ and $F_{XII}$ relating to the lens elements X, XI and XII respectively have values as given in the mathematical statements herebelow wherein the minus (−) sign denotes negative focal length.

$$0.246\ D < F_X < 0.286\ D$$
$$0.128\ D < -F_{XI} < 0.168\ D$$
$$1.644\ D < F_{XII} < 1.90\ D$$

Ideally, the values for $F_X$, $-F_{XI}$ and $F_{XII}$ should be substantially 0.266 D, −0.148 D and 1.772 D respectively. The corresponding values of axial thicknesses $t_{40}$, $t_{41}$ and $t_{42}$ for elements X to XII respectively are stated the following mathematical expressions.

$$0.029\ D < t_{40} < 0.033\ D$$
$$0.017\ D < t_{41} < 0.021\ D$$
$$0.047\ D < t_{42} < 0.053\ D$$

Ideally, the values of $t_{40}$, $t_{41}$ and $t_{42}$ are substantially 0.031 D, 0.019 D and 0.05 D respectively.

The radii of the successive refractive lens surfaces for lenses X, XI and XII are designated $R_{10}$, $-R_{11}$, $R_{12}$, $R_{13}$ and $-R_{14}$, and the values thereof in terms of D are given in the mathematical statements herebelow.

$$-2.0\ D < R_{10} < 2.0\ D$$
$$0.1588\ D < -R_{11} < 0.1864\ D$$
$$0.1300\ D < R_{12} < 0.1544\ D$$
$$1.648\ D < R_{13} < 2.0\ D$$
$$1.648\ D < -R_{14} < 2.0\ D$$

Ideally, the values for $R_{10}$ to $-R_{14}$ are given substantially in the table herebelow.

$$R_{10} = \text{Plano}$$
$$-R_{11} = 0.1726\ D$$
$$R_{12} = 0.1422\ D$$
$$R_{13} = 1.824\ D$$
$$-R_{14} = 1.824\ D$$

The axial distance between doublet lens (X, XI) and the singlet lens XII is designated $S_6$ and its value is designated by the mathematical expression herebelow:

$$0.60\ D < S_6 < 1.75\ D$$

Ideally, the value of $S_6$ stated in terms of D is 1.0 D.

Furthermore, lens elements X to XII are made of glass having the following specification of values for refractive index $n_D$ and Abbe number $\nu$.

$$1.644 < n_D(X) < 1.654$$
$$1.513 < n_D(XI) < 1.523 \text{ absolute}$$
$$1.512 < n_D(XII) < 1.522$$
$$29.6 < \nu(XI) < 37.0 \text{ values}$$
$$55.4 < \nu(XI) < 638$$
$$60.3 < \nu(XII) < 68.7$$

Ideally, $$n_D(X) = 1.649 \text{ and } \nu(X) = 33.8$$
$$n_D(XI) = 1.518 \text{ and } \nu(XI) = 59.6$$
$$n_D(XII) = 1.517 \text{ and } \nu(XII) = 64.5$$

As heretofore explained, the plurality of semiobjectives constitute an interrelated group or series, each member of the group being designed to be corrected for at least astigmatism and field flatness by combination individually with the aforementioned aberration corrector lens system 21 and to this end the values for a preferred set of semiobjectives conforming to tables I to VI are given herebelow, the image magnification produced by the semiobjective members of the group when combined with the corrector lens system 21 being 4.0x, 40x and 100x.

An eyepiece indicated generally by the numeral 25 provides the observer with a magnified image of the primary image at image plane 20, and may be any standard commercial eyepiece.

THE 0.8× SEMIOBJECTIVE

With regard to the construction of the optical parts of the above-mentioned 0.8× semiobjective lens system, a preferred form is shown in FIG. 2 and it is designated generally by the numeral 26. Comprised in said lens system 26 is the aforementioned semiobjective 14 which is constructed to have an image magnification per se of 0.80× and a numerical aperture of substantially 0.09. The equivalent focal length of the entire objective lens system 26 has a value between 0.635 D and 0.675 D and ideally has a value of substantially 0.655 D. Likewise, the equivalent focal length of the semiobjective 14 per se has a value between 0.186 D and 0.228 D and ideally has a value of substantially 0.207 D.

Pertaining to the geometrical form of the semiobjective 14, there is located nearest to the cover glass surface P a compound lens which is composed of a front double concave lens element designated I and is further composed of a double convex lens element designated II lying in edge contact with the rear surface of element I so as to provide a meniscus shaped air space therebetween.

Optically aligned with lens elements I and II and rearwardly spaced therefrom, is provided a second compound lens member which is composed of a front positive meniscus lens element designated III which is concave toward entrant light and a negative meniscus lens element designated IV lying in contact with lens III. Rearwardly spaced from element IV and aligned therewith is a singlet double convex lens designated V.

The constructional data for the 0.8× semiobjective 14 are given in the following table VII wherein values are specified in terms of D, said data pertaining to:

the focal lengths which are designated $-F_I$ to $F_V$ for the successive lens elements I to V wherein the minus (−) sign denotes negative focal length;

the successive axial airspaces $S_1$ to $S_5$ between the cover glass surface P and the infinity and aberration corrector lens system 21;

the axial thicknesses $t_1$ to $t_5$ of said successive lens elements; the radii of the successive lens surfaces which are designated $-R_1$ to $-R_9$ wherein the minus (−) sign means that the surface is concave toward incident light;

the refractive index designated $n_D$ (I) to $n_D$ (V) of the glass in the successive lens elements I to V;

and the Abbe number designated $\nu$ of the glass in the elements I to V which are designated $\nu$ (I) to $\nu$ (V).

TABLE VII

| | | | | |
|---|---|---|---|---|
| .125 D | < | $F_I$ | < | 0.153 D |
| 0.148 D | < | $F_{II}$ | < | 0.179 D |
| 0.176 D | < | $F_{III}$ | < | 0.216 D |
| 0.233 D | < | $F_{IV}$ | < | 0.284 D |
| 0.282 D | < | $F_V$ | < | 0.343 D |
| 0.118 D | < | $S_1$ | < | 0.136 D |
| 0.0000 D | < | $S_2$ | < | 0.0026 D |
| 0.268 D | < | $S_3$ | < | 0.327 D |
| 0.0002 D | < | $S_4$ | < | 0.0100 D |
| 0.035 D | < | $S_5$ | < | 0.047 D |
| 0.016 D | < | $t_1$ | < | 0.022 D |
| 0.028 D | < | $t_2$ | < | 0.034 D |
| 0.033 D | < | $t_3$ | < | 0.043 D |
| 0.021 D | < | $t_4$ | < | 0.025 D |
| 0.028 D | < | $t_5$ | < | 0.034 D |
| 0.193 D | < | $-R_1$ | < | 0.233 D |
| 0.136 D | < | $R_2$ | < | 0.164 D |
| 0.143 D | < | $R_3$ | < | 0.175 D |
| 0.359 D | < | $-R_4$ | < | 0.439 D |
| 0.902 D | < | $-R_5$ | < | 1.102 D |
| 0.085 D | < | $-R_6$ | < | 0.101 D |
| 0.178 D | < | $-R_7$ | < | 0.218 D |
| 0.211 D | < | $R_8$ | < | 0.257 D |
| 0.439 D | < | $-R_9$ | < | 0.539 D |
| 1.615 | < | $n_D$ (I) | < | 1.625 [1] |
| 1.715 | < | $n_D$ (II) | < | 1.725 [1] |
| 1.510 | < | $n_D$ (III) | < | 1.518 [1] |
| 1.746 | < | $n_D$ (IV) | < | 1.756 [1] |
| 1.510 | < | $n_D$ (V) | < | 1.518 [1] |
| 56.0 | < | $\nu$ (I) | < | 64.0 [1] |
| 26.0 | < | $\nu$ (II) | < | 34.0 [1] |
| 65.0 | < | $\nu$ (III) | < | 75.0 [1] |
| 23.0 | < | $\nu$ (IV) | < | 33.0 [1] |
| 65.0 | < | $\nu$ (V) | < | 75.0 [1] |

[1] Absolute values.

Ideally, the values for the constructional data for the 0.8× semiobjective 14 are substantially as stated in table VIII herebelow, the symbolism remaining the same as in table VII.

TABLE VIII $-F_I = 0.139$ D
$F_{II} = 0.162$ D
$F_{III} = 0.198$ D
$-F_{IV} = 0.259$ D
$F_V = 0.312$ D
$S_1 = 0.127$ D
$S_2 = 0.00025$ D
$S_3 = 0.298$ D
$S_4 = 0.005$ D
$S_5 = 0.041$ D
$t_1 = 0.019$ D
$t_2 = 0.031$ D
$t_3 = 0.038$ D
$t_4 = 0.023$ D
$t_5 = 0.031$ D
$-R_1 = 0.213$ D
$R_2 = 0.150$ D
$R_3 = 0.159$ D
$-R_4 = 0.339$ D
$-R_5 = 1.002$ D
$-R_6 = 0.093$ D
$-R_7 = 0.198$ D
$R_8 = 0.234$ D
$-R_9 = 0.489$ D
$n_D$ (I) = 1.620 [1]
$n_D$ (II) = 1.720 [1]
$n_D$ (III) = 1.514 [1]
$n_D$ (IV) = 1.751 [1]
$n_D$ (V) = 1.514 [1]
$\nu$ (I) = 60.3 [1]
$\nu$ (II) = 29.3 [1]
$\nu$ (III) = 70.0 [1]
$\nu$ (IV) = 27.8 [1]
$\nu$ (V) = 70.0.[1]

[1] Absolute values.

THE 8× SEMIOBJECTIVE

With regard to the construction of the optical parts of the above-mentioned 8× semiobjective lens system, a preferred form is shown in FIG. 3 at 16 which is a part of an optical system designated generally by the numeral 28. Comprised in said lens system 28 is the aforementioned semiobjective 16 which is constructed to have an image magnification per se of 8× and a numerical aperture of substantially 0.65. The equivalent focal length of the entire objective lens system 28 has a value between 0.115 D and 0.140 D and ideally has a value of substantially 0.128 D. Likewise, the equivalent focal length of the semiobjective 16 per se has a value between 0.077 D and 0.097 D and ideally has a value of substantially 0.087 D.

Pertaining to the geometrical form of the semiobjective 16, there is located nearest to the cover glass surface P a singlet positive meniscus lens of thick construction which is designated BI. In optical alignment rearwardly of lens BI is a succession of lenses, the nearest of which is air spaced at a short distance therefrom and is a positive meniscus singlet, said lens being designated BII. Spaced rearwardly from lens BII is a front compound lens which is composed of a front negative meniscus lens which is concave toward the rear and is designated BIII. Lying in contact with the rear face of lens BIII is a double convex lens element which is designated BIV. Spaced still further rearwardly is a rear compound lens which is composed of a front negative meniscus lens which is designated BV and is concave toward the rear. Lying in contact with the rear surface of lens element BV is a double convex lens element which is designated BVI.

The successive axial airspaces between the cover glass surface P and the infinity and aberration corrector lens system 21 are designated $S_{10}$ to $S_{14}$ and the axial thicknesses of the successive lens elements are designated $t_{11}$ to $t_{16}$ for the lens elements B1 to BVI respectively.

The constructional data for the 8× semiobjective 16 is given in the following table IX wherein values in terms of D are specified, said data pertaining to:

the focal lengths which are designated $F_{BI}$ to $F_{BVI}$ for the successive elements BI to BVI wherein the minus (−) sign denotes negative focal length;

the successive axial airspaces $S_{10}$ to $S_{14}$, the axial thicknesses $t_{11}$ to $t_{16}$, the radii of the successive lens surfaces on said lens elements, the surfaces being designated in order as $-R_{B1}$ to $-R_{B10}$ wherein the minus (−) sign means that the surface is concave toward incident light;

the refractive index designated $n_D$ (BI) to $n_D$ (BVI) of the glass in the successive lens elements BI to BVI;

and the Abbe number designated $\nu$ of the glass in the elements BI to BVI which are designated $\nu$ (BI) to $\nu$ (BVI);

TABLE IX

| | | |
|---|---|---|
| 0.164 D < | $F_{BI}$ | < 0.202 D |
| 0.270 D < | $F_{BII}$ | < 0.329 D |
| 0.235 D < | $-F_{BIII}$ | < 0.287 D |
| 0.174 D < | $F_{BIV}$ | < 0.212 D |
| 0.237 D < | $-F_{BV}$ | < 0.289 D |
| 0.164 D < | $F_{BVI}$ | < 0.198 D |
| 0.006 D < | $S_{10}$ | < 0.008 D |
| 0.001 D < | $S_{11}$ | < 0.005 D |
| 0.004 D < | $S_{12}$ | < 0.008 D |
| 0.004 D < | $S_{13}$ | < 0.008 D |
| 0.282 D < | $S_{14}$ | < 0.540 D |
| 0.080 D < | $t_{11}$ | < 0.100 D |
| 0.028 D < | $t_{12}$ | < 0.034 D |
| 0.017 D < | $t_{13}$ | < 0.021 D |
| 0.042 D < | $t_{14}$ | < 0.052 D |
| 0.035 D < | $t_{15}$ | < 0.043 D |
| 0.047 D < | $t_{16}$ | < 0.057 D |
| 0.070 D < | $-R_{B1}$ | < 0.088 D |
| 0.061 D < | $-R_{B2}$ | < 0.073 D |
| 0.886 D < | $-R_{B3}$ | < 1.082 D |
| 0.122 D < | $-R_{B4}$ | < 0.146 D |
| 0.778 D < | $R_{B5}$ | < 0.952 D |
| 0.138 D < | $R_{B6}$ | < 0.168 D |
| 0.225 D < | $-R_{B7}$ | < 0.279 D |
| 0.456 D < | $R_{B8}$ | < 0.558 D |
| 0.122 D < | $R_{B9}$ | < 0.152 D |
| 0.230 D < | $-R_{B10}$ | < 0.282 D |
| 1.615 < | $n_D$ (BI) | < 1.625 [1] |
| 1.510 < | $n_D$ (BII) | < 1.518 [1] |
| 1.715 < | $n_D$ (BIII) | < 1.725 [1] |
| 1.510 < | $n_D$ (BIV) | < 1.518 [1] |
| 1.744 < | $n_D$ (BV) | < 1.754 [1] |
| 1.510 < | $n_D$ (BVI) | < 1.518 [1] |
| 55.0 < | $\nu$ (BI) | < 65.0 [1] |
| 65.0 < | $\nu$ (BII) | < 75.0 [1] |
| 24.0 < | $\nu$ (BIII) | < 34.0 [1] |
| 65.0 < | $\nu$ (BIV) | < 75.0 [1] |
| 30.0 < | $\nu$ (BV) | < 40.0 [1] |
| 65.0 < | $\nu$ (BVI) | < 75.0 [1] |

[1] Absolute values.

Ideally, the values for the constructional data for the 8× semiobjective 16 are substantially as stated in table X herebelow, the symbolism remaining the same as in the previous table:

TABLE X $F_{BI} = 0.183$ D
$F_{BII} = 0.2995$ D
$-F_{BIII} = 0.261$ D
$F_{BIV} = 0.193$ D
$-F_{BV} = 0.263$ D
$F_{BVI} = 0.181$ D
$S_{10} = 0.007$ D
$S_{11} = 0.003$ D
$S_{12} = 0.006$ D
$S_{13} = 0.006$ D
$S_{14} = 0.311$ D
$t_{11} = 0.090$ D
$t_{12} = 0.031$ D
$t_{13} = 0.019$ D
$t_{14} = 0.047$ D
$t_{15} = 0.039$ D
$t_{16} = 0.052$ D
$-R_{B1} = 0.079$ D
$-R_{B2} = 0.067$ D
$-R_{B3} = 0.984$ D
$-R_{B4} = 0.134$ D
$R_{B5} = 0.865$ D
$R_{B6} = 0.153$ D
$-R_{B7} = 0.252$ D
$R_{B8} = 0.507$ D
$R_{B9} = 0.137$ D
$-R_{B10} = 0.256$ D
$n_D$ (BI) = 1.620 [1]
$n_D$ (BII) = 1.514 [1]
$n_D$ (BIII) = 1.720 [1]
$n_D$ (BIV) = 1.514 [1]
$n_D$ (BV) = 1.749 [1]

TABLE X — Continued $n_D$ (BVI) = 1.514 [1]
$\nu$ (BI) = 60.3 [1]
$\nu$ (BII) = 70.0 [1]
$\nu$ (BIII) = 29.3 [1]
$\nu$ (BIV) = 70.0 [1]
$\nu$ (BV) = 35.0 [1]
$\nu$ (BVI) = 70.0 [1]

[1] Absolute values.

THE 20× SEMIOBJECTIVE

With regard to the construction of the optical parts of the above-mentioned 20× semiobjective lens system, a preferred form is shown in FIG. 4 and it is designated generally by the numeral 17. Said semiobjective 17 is comprised in the aforesaid objective lens system 30 and is constructed to have an image magnification per se of 20× and a numerical aperture of 1.25. The equivalent focal length of the entire objective lens system 30 has a value between 0.050 D and 0.058 D and ideally has a value of substantially 0.054 D. Likewise, the equivalent focal length of the semiobjective 17 per se has a value between 0.037 D and 0.043 D and ideally has a value of substantially 0.040 D.

Pertaining to the geometrical form of the semiobjective 17, there is located nearest to the cover glass surface P a compound lens which includes a foremost plane-parallel plate designated CI, said semiobjective being of the oil immersion type having a suitable liquid located between surface P and plate CI. Contacting the rear surface of element CI is a hemispherical lens element designated CII. Spaced rearwardly from and in axial alignment with element CII there is provided a positive meniscus singlet lens designated CIII and spaced rearwardly from this lens is a double convex singlet lens designated CIV. Rearwardly of the last-named lens is a succession of two compound lenses of similar construction, the foremost of which is composed of a negative meniscus lens element which is designated CV and is concave toward the rear. In contact with the concave surface of lens element CV is a double convex lens element which is designated CVI, and spaced rearwardly therefrom is the foremost element which is designated CVII of the rear compound lens. In contact with the concave surface of lens element CVII is a double convex lens element designated CVIII and spaced rearwardly from said element is a rearmost positive meniscus singlet lens which is designated CIX.

A considerable distance rearwardly of the meniscus lens CIX is located the infinity and aberration corrector lens system 21 which is common to all of the semiobjectives 14 to 17 and is described in detail heretofore.

The constructional data for the 20× semiobjective 17 is given in the following table XI wherein values for the data in terms of D are specified, said values pertaining to:

the successive airspaces between the cover glass surface and the aberration corrector lens system 21 which are $S_{15}$ to $S_{21}$;

the focal lengths of the successive lens elements CI to CIX which are designated $F_{CI}$ to $F_{CIX}$, wherein the minus (−) sign denotes negative focal length;

the axial thicknesses of the aforesaid lens elements being designated $t_{17}$ to $t_{25}$;

the radii of the successive lens surfaces on said lens elements being designated $R_{C1}$ to $R_{C15}$, wherein the minus (−) sign means that the surface is concave toward incident light;

the refractive index of the glass in the successive lens elements CI to CIX being designated $n_D$ (CI) to $n_D$ (CIX);

and the Abbe number $\nu$ of the glasses in said elements being designated $\nu$ (CI) to $\nu$ (CIX);

TABLE XI

| | | |
|---|---|---|
| 0.040 D < | $F_{CI}$ | > ±5.0 D |
| 0.174 D < | $F_{CII}$ | < 0.048 D |
| 0.214 D < | $F_{CIII}$ | < 0.210 D |
| 0.179 D < | $F_{CIV}$ | < 0.260 D |
| 0.155 D < | $-F_{CV}$ | < 0.215 D |
| 0.181 D < | $F_{CVI}$ | < 0.193 D |
| 0.171 D < | $-F_{CVII}$ | < 0.219 D |
| 2.876 D < | $F_{CVIII}$ | < 0.209 D |
| 0.0012 D < | $F_{CIX}$ | < 3.510 D |
| .000 D < | $S_{15}$ | < 0.0016 D |
| 0.005 D < | $S_{16}$ | < .0006 D |
| 0.0009 D < | $S_{17}$ | < 0.009 D |
| | $S_{18}$ | < 0.0015 D |

TABLE XI (continued)

| | | | | |
|---|---|---|---|---|
| 0.0009 D | < | $S_{19}$ | < | 0.0015 D |
| 0.0012 D | < | $S_{20}$ | < | 0.0039 D |
| 0.260 D | < | $S_{21}$ | < | .330 D |
| 0.011 D | < | $t_{17}$ | < | 0.015 D |
| 0.023 D | < | $t_{18}$ | < | 0.031 D |
| 0.026 D | < | $t_{19}$ | < | 0.032 D |
| 0.027 D | < | $t_{20}$ | < | 0.033 D |
| 0.016 D | < | $t_{21}$ | < | 0.022 D |
| .040 D | < | $t_{22}$ | < | 0.048 D |
| 0.016 D | < | $t_{23}$ | < | .022 D |
| 0.040 D | < | $t_{24}$ | < | 0.048 D |
| 0.045 D | < | $t_{25}$ | < | 0.055 D |
| | | $R_{C1}$ | = | Plano |
| | | $R_{C2}$ | = | Plano |
| 0.023 D | < | $-R_{C3}$ | < | 0.031 D |
| 0.146 D | < | $-R_{C4}$ | < | 0.178 D |
| 0.066 D | < | $-R_{C5}$ | < | 0.080 D |
| 0.792 D | < | $R_{C6}$ | < | 0.970 D |
| 0.125 D | < | $-R_{C7}$ | < | 0.155 D |
| 0.672 D | < | $R_{C8}$ | < | 0.820 D |
| 0.106 D | < | $R_{C9}$ | < | 0.130 D |
| 0.282 D | < | $-R_{C10}$ | < | 0.346 D |
| 0.634 D | < | $R_{C11}$ | < | 0.778 D |
| 0.106 D | < | $R_{C12}$ | < | 0.130 D |
| 0.439 D | < | $-R_{C13}$ | < | 0.537 D |
| 0.150 D | < | $R_{C14}$ | < | 0.186 D |
| 0.150 D | < | $R_{C15}$ | < | 0.186 D |
| 1.665 | < | $n_D$ (CI) | < | 1.675 [1] |
| 1.615 | < | $n_D$ (CII) | < | 1.625 [1] |
| 1.615 | < | $n_D$ (CIII) | < | 1.625 [1] |
| 1.500 | < | $n_D$ (CIV) | < | 1.518 [1] |
| 1.700 | < | $n_D$ (CV) | < | 1.740 [1] |
| 1.500 | < | $n_D$ (CVI) | < | 1.518 [1] |
| 1.700 | < | $n_D$ (CVII) | < | 1.740 [1] |
| 1.500 | < | $n_D$ (CVIII) | < | 1.518 [1] |
| 1.500 | < | $n_D$ (CIX) | < | 1.518 [1] |
| 42.0 | < | $\nu$ (CI) | < | 52.0 [1] |
| 55.0 | < | $\nu$ (CII) | < | 65.0 [1] |
| 55.0 | < | $\nu$ (CIII) | < | 65.0 [1] |
| 65.0 | < | $\nu$ (CIV) | < | 75.0 [1] |
| 26.0 | < | $\nu$ (CV) | < | 36.0 [1] |
| 65.0 | < | $\nu$ (CVI) | < | 75.0 [1] |
| 26.0 | < | $\nu$ (CVII) | < | 36.0 [1] |
| 65.0 | < | $\nu$ (CVIII) | < | 75.0 [1] |
| 65.0 | < | $\nu$ (CIX) | < | 75.0 [1] |

[1] Absolute values.

Ideally, the values for the constructional data for the 20× semiobjective 17 are substantially as stated in table XII herebelow, the symbolism remaining the same as heretofore:

TABLE XII $FF_{CI} = \infty$
$F_{CII} = 0.044$ D
$F_{CIII} = 0.192$ D
$F_{CIV} = 0.237$ D
$-F_{CV} = 0.197$ D
$F_{CVI} = 0.174$ D
$-F_{CVII} = 0.200$ D
$F_{CVIII} = 0.190$ D
$F_{CIX} = 3.193$ D
$S_{15} = 0.0014$ D
$S_{16} = 0.0003$ D
$S_{17} = 0.007$ D
$S_{18} = .0012$ D
$S_{19} = .0012$ D
$S_{20} = .0027$ D
$S_{21} = 0.295$ D
$t_{17} = 0.013$ D
$t_{18} = 0.027$ D
$t_{19} = 0.029$ D
$t_{20} = 0.030$ D
$t_{21} = 0.019$ D
$t_{22} = 0.044$ D
$t_{23} = 0.019$ D
$t_{24} = 0.044$ D
$t_{25} = 0.050$ D
$R_{C1} = $ Plano
$R_{C2} = $ Plano
$-R_{C3} = 0.027$ D
$-R_{C4} = 0.162$ D
$-R_{C5} = 0.073$ D
$R_{C6} = 0.881$ D
$-R_{C7} = 0.140$ D
$R_{C8} = 0.746$ D
$R_{C9} = 0.118$ D
$-R_{C10} = 0.314$ D
$R_{C11} = 0.706$ D
$R_{C12} = 0.118$ D
$-R_{C13} = 0.488$ D
$R_{C14} = 0.168$ D
$R_{C15} = 0.168$ D
$n_D$ (CI) = 1.670 [1]
$n_D$ (CII) = 1.620 [1]
$n_D$ (CIII) = 1.620 [1]

TABLE XII - Continued $n_D$ (CIV) = 1.514 [1]
$n_D$ (CV) = 1.720 [1]
$n_D$ (CVI) = 1.514 [1]
$n_D$ (CVII) = 1.720 [1]
$n_D$ (CVIII) = 1.514 [1]
$n_D$ (CIX) = 1.514 [1]
$\nu$ (CI) = 47.2 [1]
$\nu$ (CII) = 60.3 [1]
$\nu$ (CIII) = 60.3 [1]
$\nu$ (CIV) = 70.0 [1]
$\nu$ (CV) = 29.3 [1]
$\nu$ (CVI) = 70.0 [1]
$\nu$ (CVII) = 29.3 [1]
$\nu$ (CVIII) = 70.0 [1]
$\nu$ (CIX) = 70.0 [1]

[1] Absolute values.

The salient fact in the foregoing description concerns a microscope objective lens system comprising a plurality of semiobjectives of progressively increasing magnification ratings which together with a commonly used aberration corrector lens system 21 produce a greatly improved quality in the final image, the semiobjectives being interrelated and designed aberrationwise with respect to each other and their common aberration corrector lens system 21 in a manner which achieves a superior correction particularly to field curvature, astigmatism, coma, spherical aberration and residual lateral chromatism. The spherical aberration correction is aided to a considerable degree by the inclusion of a maximum number of low curvature lens surfaces in the optical system.

Although only a certain form of the present invention has been shown and described in detail for all parts of of the objective lens system, other forms are possible and changes may be made in the details of construction within the specified combination and as set forth in tables I—XII without departing from the spirit of the invention.

I claim:

1. A multipowered micro-objective lens system having a range of power comparable to standard micro-objectives for forming a superior image of an object which is viewed by an aligned eyepiece, the system comprising;
a plurality of semiobjectives which are interchangeably mounted in a microscope nosepiece for individual optical alignment on the optical axis of the microscope,
the semiobjectives having individual magnifications ranging from low to high values and having a common finite object-to-image distance per se, the focal lengths of the higher powered semiobjectives being increased to reduce the Petzval sum of the higher powered semiobjectives without necessitating a change in overall power or object-to-image distance, the object-to-image distance and the magnifications of the semiobjectives being less than the object-to-image distance and magnifications of standard micro-objectives,
the lower powered semiobjectives having an amount of deliberately introduced lateral color aberration approximately the same as the inherent lateral color aberration in the higher powered semiobjectives,
an aberration corrector lens system including
a negative lens system aligned at a fixed axial position on the optical axis of the microscope rearwardly of said semiobjectives and which substantially focuses the primary image of the semiobjectives at infinity and a telescope objective system which forms an image at the eyepiece focal plane, the telescope objective system being the rearmost lens component of the micro-objective lens system wherein said aberration corrector lens system is used in common with each individual semiobjective when the semiobjective is in optical alignment on the optical axis of the microscope,
the negative lens system per se containing amounts of compensating corrective aberrations therein which in individual combination with each one of the semiobjectives reduces the cumulative aberrations in the image with regard to Petzval sum, coma, and astigmatism, which are produced by the complete micro-objective, the aberrations remaining in the image being approximately the same for each of the plurality of semiobjectives when in combination with the negative lens system throughout the complete range of magnification, and the telescope objective lens system per se being constructed to substantially eliminate the residual lateral chromatic aberration of the first said lens system.

2. A multipowered micro-objective lens system having a range of power comparable to standard micro-objectives for forming a superior image of an object when viewed through an eyepiece lens system, the system comprising:

a plurality of semiobjectives which are interchangeably mounted in a microscope nosepiece for individual optical alignment on the optical axis of the microscope, the semiobjectives having individual magnifications ranging from low to high values and forming an image at a common finitely positioned intermediate image plane per se, the focal lengths of the higher powered semiobjectives being increased to reduce the undercorrected field curvature aberration of the higher powered semiobjectives without necessitating a change in overall power or object-to-image distance of the micro-objective, the object-to-image distance of the semiobjectives per se being less than the object-to-image distance of standard micro-objectives, each of the semiobjectives being undercorrected with regard to field curvature, coma, and astigmatism, the lower powered semiobjectives having an amount of deliberate overcorrection for lateral color approximately the same as the inherent overcorrection for lateral color in the higher powered semiobjectives, an aberration corrector lens system including a front negative doublet lens member which substantially focuses the primary image of the semiobjectives at infinity and a rearward positive singlet telescope objective lens member aligned therewith at a focusable axial position on the optical axis of the microscope and focused at the focal plane of said eyepiece lens system, said intermediate image plane being located intermediate of the aberration corrector lens system, the aberration corrector lens system being the rearmost component of the micro-objective lens system and acting in common with each individual semiobjective which is in optical alignment on the optical axis of the microscope, the negative doublet lens member containing amounts of overcorrected aberrations therein which in individual combination with each one of the semiobjectives reduces the cumulative aberrations in the image with regard to field curvature, coma and astigmatism which are produced by the complete micro-objective, the aberrations remaining in the image being substantially identical for each of the plurality of semiobjectives when in combination with said negative member, said positive singlet lens member being chromatically corrected to substantially eliminate lateral color aberration whereby a standard eyepiece lens system may be used in conjunction with all of the semiobjectives and the product of the magnification of any selected one of the semiobjectives multiplied by the magnification of the aberration corrector lens system being approximately the same as the magnification of a standard micro-objective having a numerical aperture comparable to the selected combination.

3. A microscope objective system of superior image quality including the combination of a plurality of semiobjectives which are interchangeably mounted in a rotatable nosepiece for optical alignment on the optical axis of the microscope, said semiobjectives having positive focal lengths and having individual magnifications ranging from low to high values, said semiobjectives having a common finite object-to-image distance per se, the magnification of each said semiobjective being substantially one-fifth of the magnification of said complete objective system, said semiobjectives per se being undercorrected lens systems with regard to field curvature, coma, and astigmatism, and being overcorrected for lateral color, an aberration corrector lens system comprising a front negative lens member aligned at a fixed axial position on the optical axis rearwardly of said semiobjectives and focused substantially at infinity and further comprising a coaxial focusable rear telescope lens member, said aberration corrector lens system serving as a rear component which is common to each of said plurality of semiobjectives when aligned therewith and effecting an image magnification of substantially 5×, said aberration corrector lens system further having a compensating amount of corrective aberration constructed therein which in combination individually with each of said semiobjectives reduces to minimum values the cumulative aberrations in the image with regard to field curvature, coma, and astigmatism, which are produced by the entire optical system throughout the complete range of magnification, and said rear positive lens member having such an Abbe number value that the residual lateral chromatism of said image is reduced substantially to zero whereby standard commercial eyepieces may be used to view said image.

UNITED STATES PATENT OFFICE
CERTIFICATE OF CORRECTION

Patent No. 3,583,789　　　　　　　　Dated　June 8, 1971

Inventor(s)　HAROLD E. ROSENBERGER

It is certified that error appears in the above-identified patent and that said Letters Patent are hereby corrected as shown below:

Col. 4, line 60, change "(XI)" to -- (X) --;
　　　　line 61, change "638" to -- 63.8 --;

Col. 9, line 39 (Table XII), change "$FF_{CI}$" to -- $F_{CI}$ --;

Col. 10, line 26, change "to" to -- of --

Signed and sealed this 7th day of December 1971.

(SEAL)
Attest:

EDWARD M. FLETCHER, JR.　　　　ROBERT GOTTSCHALK
Attesting Officer　　　　　　　　Acting Commissioner of Patents